United States Patent [19]

Rodgers

[11] Patent Number: 4,846,697

[45] Date of Patent: Jul. 11, 1989

[54] CABLE FOR INTERCONNECTING LIGHTING SYSTEMS OF TOWING VEHICLE AND TRAILER

[76] Inventor: E. Walter Rodgers, 5650 W. Marconi, Glendale, Ariz. 85306

[21] Appl. No.: 115,824

[22] Filed: Nov. 2, 1987

[51] Int. Cl.$^4$ ............................................. H01R 11/32
[52] U.S. Cl. ..................................... 439/35; 439/503; 439/623
[58] Field of Search ..................................... 439/34–36, 439/49, 52, 53, 217–224, 501–506, 623

[56] References Cited

U.S. PATENT DOCUMENTS

| | | | |
|---|---|---|---|
| 2,660,679 | 11/1953 | Hunt | 439/222 |
| 3,092,430 | 6/1963 | Miller | 439/502 |
| 4,057,310 | 11/1977 | Young | 339/10 |
| 4,072,381 | 2/1978 | Burkhart et al. | 339/29 |
| 4,182,005 | 1/1980 | Harrington | 439/501 |
| 4,270,115 | 5/1981 | Bonnett | 340/67 |
| 4,405,190 | 9/1983 | Schroeder | 339/28 |
| 4,477,801 | 10/1984 | Robinson, Jr. et al. | 439/504 |
| 4,648,682 | 3/1987 | Tubbs | 439/502 |

FOREIGN PATENT DOCUMENTS

| | | | |
|---|---|---|---|
| 0582903 | 9/1959 | Canada | 439/504 |
| 0483220 | 9/1929 | Fed. Rep. of Germany | 439/504 |
| 0325632 | 2/1930 | United Kingdom | 439/623 |

OTHER PUBLICATIONS

Del City Wire Co., Inc., Catalog No. 228, Copyright 1987.
Del City Wire Co., Inc., Catalog No. 83A, Copyright 1983.

Primary Examiner—Gary F. Paumen
Attorney, Agent, or Firm—Cahill, Sutton & Thomas

[57] ABSTRACT

A universal wiring connection cord is disclosed for interconnecting various types of wiring sockets that are interconnected with the electrical lighting system of a towing vehicle to various types of wiring plugs that may be interconnected with the electrical lighting system of a trailer. The universal wiring connection cord includes a central cable housing a number of stranded electrical wires bundled therein. The bundled electrical wires extend from a first end of the central cable and are provided with electrical connectors adapted to be engaged with the electrical terminals housed within the wiring socket mounted to the towing vehicle. The ends of the wires extending from the first end of the central cable are free to move with respect to one another in order to be positioned in the pinout pattern of the wiring socket. The electrical wires also extend from the opposing second end of the central cable and are provided with electrical connectors adapted to be engaged with the terminals housed in the wiring plug mounted to the trailer. Again, the second ends of the electrical wires are free to move relative to one another to match the layout of the terminals within the wiring plug of the trailer. One of the electrical wires is provided at each end with a spring-biased clip for establishing ground connections at the towing vehicle and trailer ends. Rigid wire extensions are provided at the towing vehicle end of the connection cord to facilitate insertion of the connectors into the wiring socket mounted to the towing vehicle.

17 Claims, 2 Drawing Sheets

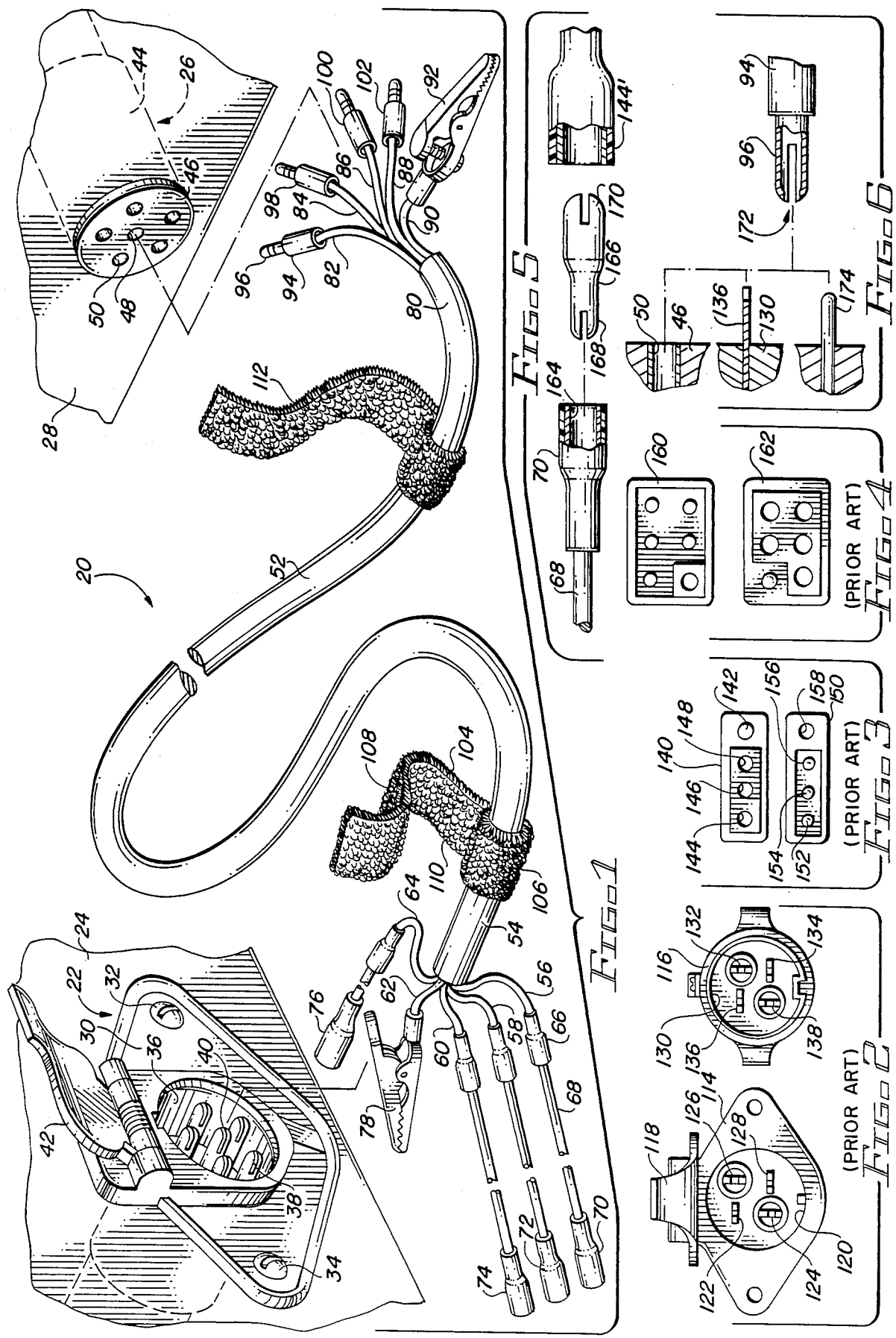

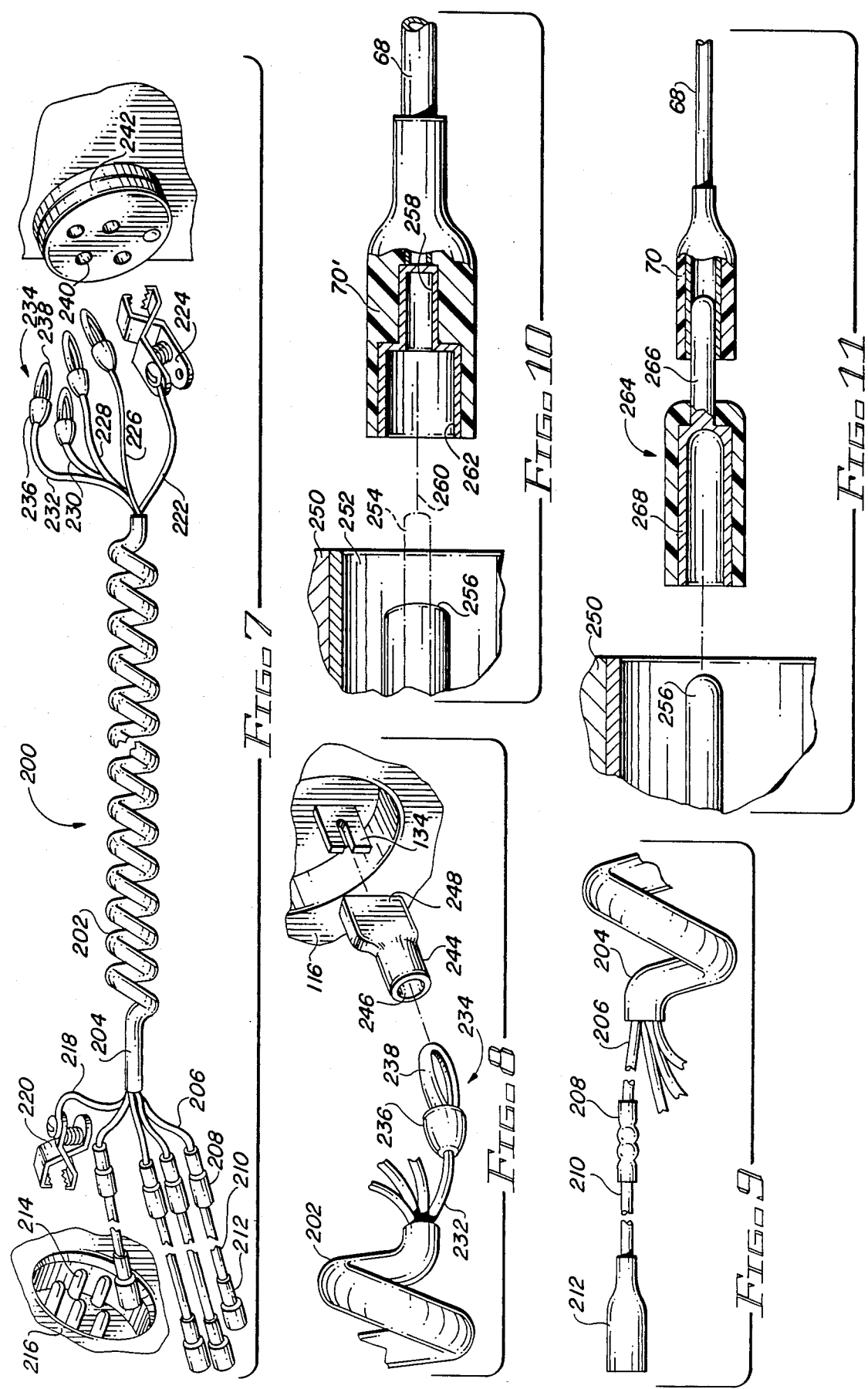

CABLE FOR INTERCONNECTING LIGHTING SYSTEMS OF TOWING VEHICLE AND TRAILER

BACKGROUND OF THE INVENTION

1. Field of the Invention

The present invention relates generally to apparatus for interconnecting the electrical lighting system of a trailer to the electrical lighting system of a towing vehicle, and more particularly, to a universal cable for interconnecting a wide variety of wiring sockets mounted to the towing vehicle to a wide variety of wiring plugs mounted to the trailer.

2. Description of the Prior Art

Cars and trucks are often used to pull wheeled boat trailers, campers, and other wheeled vehicles behind them. In such instances, it is necessary to interconnect the rear brake lights, turn signal indicators, and night running lights within the electrical system of the trailer to the electrical system of the towing vehicle, for allowing other drivers following behind the trailer to anticipate stops and turns, and to see the trailer ahead at night. Owners of the towing vehicles typically install, or have installed, a wiring interconnection kit including a wiring socket that is interconnected with the electrical lighting system of the towing vehicle, and a wiring plug that is interconncted with the electrical lighting system of the trailer. Wiring sockets and wiring plugs purchased as a kit are matched with one another, whereby the wiring plug is received within the wiring socket. The wiring socket includes a number of electrical terminals arranged in a predetermined pattern, while the wiring socket includes an equal number of electrical terminals arranged in the same predetermined pattern for mating with one another as the wiring plug is inserted into the wiring socket When a user originally installs the aforementioned kit, the user is directed to interconnect the wiring socket with the towing vehicle, and to interconnect the wiring plug with the trailer, such that the electrical terminal within the wiring socket that is interconnected with the brake light of the towing vehicle will mate with the electrical terminal in the wiring plug that connects to the brake lights of the trailer, and so forth. Such kits are available in a variety of forms. For example, molded trailer connectors having anywhere from 2 to 6 wiring terminals are available from Del City Wire Co., Inc. of Oklahoma City, Oklahoma. Such molded connectors include matching male and female connectors, with electrical terminals arranged either in a single row or in two adjacent rows. The same company also sells a chromed trailer connector for mounting to a towing vehicle and including a socket provided with a hinged, spring-biased metal cover to keep out moisture and dust when not in use. A mating plug is provided for wiring into the electrical lighting system of the trailer. Such chromed connectors are available in 4 and 5 contact varieties; the pattern of electrical pins provided within the 4 contact socket differs from the pattern used in the 5 contact socket. Six contact chromed metal connectors and associated plugs, are also commercially available.

Apart from differences in the physical form, shape, and number of electrical terminals provided in various types of wiring sockets and related wiring plugs for use with trailers, the form of the electrical terminals within such wiring sockets and wiring plugs may also vary, some of the electrical terminals being provided as conventional male jacks and female sockets, while others are provided as split spade connectors.

Discrepancies between various types of trailer wiring connectors do not pose a problem when the owner of the towing vehicle is pulling his own trailer having an electrical wiring plug that is compatible with the wiring socket mounted on the towing vehicle. However, in those instances when the owner of the towing vehicle borrows a trailer or other wheeled vehicle owned by another person, it often happens that the wiring plug installed in such trailer is incompatible with the wiring socket already mounted on the towing vehicle. In such cases, the owner of the towing vehicle is faced with the inconvenience of having to disconnect the wiring socket already mounted to the towing vehicle, purchasing a wiring socket compatible with the wiring plug installed upon the trailer, and interconnecting the new wiring socket to the electrical lighting system of the towing vehicle in a manner which matches the wiring pattern used to interconnect the wiring plug to the electrical lighting system of the trailer. Not only does this process take a significant amount of time, but it often happens that wires are inadvertently crossed during the rewiring process, resulting in fuses being blown. Moreover, before the owner of the towing vehicle can again tow his own trailer, the owner must rewire the towing vehicle back to the originally installed wiring socket.

Various efforts have been made in the past to overcome the problems described above. For example, U.S. Pat. No. 2,660,679 issued to Hunt discloses a coupling system for interchangeably connecting the wiring systems of truck tractors and trailers. However, the apparatus disclosed therein requires that each tractor be provided with a specific form of wiring plug, and that each tractor be provided with a specific form of plug having a series of individual jacks. Such a system is incompatible with the conventional forms of wiring socket and wiring plugs commercially available for use with cars and light duty trucks. U.S. Pat. No. 4,405,190 issued to Schroeder discloses a circuit interchange module for interconnecting a towing vehicle to a trailer. The interchange module is specifically designed to be used only with single-row molded trailer connectors having 4 contacts; the interchange module serves to reorder the wiring terminals of one molded connector with respect to the other molded connector to correct the situation wherein the molded connector attached to the towing vehicle has been wired differently from the mating molded connector wired to the trailer. Such an interchange module, however, is incapable of coupling wiring sockets and wiring plugs of different shapes and/or having a different number of contacts.

U.S. Pat. No. 4,057,310 issued to Young discloses an electrical coupling apparatus designed to interconnect the electrical circuit of a number of different trailers to that of a number of different towing vehicles. The device includes a first polarized coupler adapted to mate with a corresponding polarized coupler interconnected with the electrical lighting system of the trailer. The device further includes a universal coupler designed to be interconnected with the electrical lighting system of the trailer. Also included is a universal coupler designed to be interconnected with the electrical lighting system of the towing vehicle and having a series of electrical contacts formed thereon. The aforementioned polarized coupler is interconnected with the universal coupler by a plurality of interchangeable wire leads. However, the use of such a system requires that any wiring socket previously attached to the towing vehicle be removed in favor of the universal coupler. Moreover, while the polarized coupler may mate with some forms of trailer wiring plugs, it is not designed to mate with more than one type of trailer wiring plug.

U.S. Pat. No. 4,270,115 issued to Bonnett discloses an adapter for interconnecting a 4 wire electrical lighting system of a towed vehicle to a three-wire electrical lighting system of a towing vehicle. However, it does not appear that the disclosed apparatus is adapted to interconnect wiring sockets and wiring plugs of different shapes and/or having different patterns of electrical terminals.

Accordingly, it is an object of the present invention to provide a universal wiring connection cord for interconnecting the electrical lighting system of a towing vehicle with the electrical lighting system of a trailer to be towed wherein the wiring socket previously interconnected with the electrical lighting system of the towing vehicle differs in shape or style from a wiring plug previously interconnected with the electrical lighting system of the trailer.

It is another object of the present invention to provide such a universal wiring connection cord serving to interconnect a wiring socket interconnected with the electrical lighting system of the towing vehicle to a wiring plug interconnected with electrical lighting system of the trailer, even though the wiring socket and the wiring plug have differing numbers of electrical terminals and/or electrical terminals laid out in differing patterns.

It is still another object of the present invention to provide such a universal wiring connection cord for interconnecting a wiring plug interconnected with the electrical lighting system of the towing vehicle with a wiring plug interconnected to the electrical lighting system of a trailer, even though the electrical terminals within the wiring socket and the wiring plug are of differing sizes and/or of differing types.

It is a further object of the present invention to provide such a universal wiring connection cord which may be used to quickly and easily establish a common ground connection between the towing vehicle and the trailer.

It is a still further object of the present invention to provide such a universal wiring connection cord which may be easily maintained taut when in use to avoid inadvertent snagging and/or damage caused by dragging on the ground.

It is yet another object of the present invention to provide such a universal wiring connection cord which may be manufactured easily and inexpensively, and which is easy to use.

These and other objects of the present invention will become more apparent to those skilled in the art as the description thereof proceeds.

SUMMARY OF THE INVENTION

Briefly described, and in accordance with one embodiment thereof, the present invention relates to a universal wiring connection cord for electrically coupling a wiring socket interconnected with the electrical lighting system of a towing vehicle to a wiring plug interconnected with the electrical lighting system of a trailer to be towed by the towing vehicle. The wiring socket normally includes a first grouping of electrical terminals housed therein and arranged in a first predetermined pattern; similarly, the wiring plug normally includes a second grouping of electrical terminals housed therein and arranged in a second predetermined pattern, the second grouping possibly differing in number, size, style and layout from the first pattern. The universal wiring connection cord includes a central cable containing typically four or more stranded electrical wires bundled together therein, each preferably being a different color to aid in the identification of a particular wire at the opposing ends thereof. A first end of each of the bundled wires extends from one end of the central cable, the first ends of the bundled wires being moveable with respect to one another so that they may assume differing orientations in accordance with the particular pattern of electrical terminals within the wiring socket with which the first ends of such wires are to be engaged. Two or more of the first ends of the bundled wires have connectors coupled thereto adapted to be engaged over one of the electrical terminals within the wiring socket that is interconnected to the electrical lighting system of the towing vehicle. One of the bundled wires is preferably connected at its first end to a spring-biased clip for being clamped to a ground connection upon the towing vehicle.

Each of the bundled wires also extends from the opposing second end of the central cable, the second ends of the bundled wires being moveable with respect to one another in order to assume differing orientations in accordance with the pattern of electrical terminals formed within the wiring plug that is interconnected with the electrical lighting system of the trailer. Two or more of the bundled wires are coupled at their second ends to connectors adapted to engage one of the electrical terminals within the wiring plug. A spring-biased clip is again preferably connected to the second end of the bundled wire that is coupled to a spring-biased clip at its first end, the spring-biased clip being provided at the second end being clamped to a ground connection upon the trailer.

The aforementioned connectors provided at the first ends of the bundled electrical wires are preferably female socket connectors adapted to slide over electrical terminal pins housed within the wiring socket. Such female connectors are preferably coupled to the first ends of the bundled electrical wires by substantially rigid sections of wire to facilitate the proper placement of the female connectors over electrical pins recessed within the wiring socket. Such female connectors may include a stepped interior surface forming an interior socket of a lesser diameter opening into an outer socket of a greater diameter for engaging electrical pins having a diameter commensurate with that of either the inner socket or outer socket. Alternatively, each female connector may have associated therewith a female adaptor having a pin at one end for being inserted into the female connector and having a female socket at the opposing end of an internal diameter larger than that of the female connector. The female connectors may also have associated therewith bullet terminals inserted within the female connectors for effectively converting such female connectors into male connectors for engaging female sockets which may be formed in the wiring socket that is interconnected with the electrical lighting system of the towing vehicle.

Two or more of the bundled wires are provided at their second ends with male connectors adapted to be engaged with female terminals within the wiring plug that is interconnected with the electrical lighting system of the trailer. Such male connectors may be formed by banana plugs having spring like conductors for grippingly engaging female terminal sockets within the wiring socket. Spade adaptors may be removably associated with each of such male connectors for adapting the same to be engaged with split spade terminals within the wiring plug. Alternatively, the male connectors may be formed with a slotted tip portion for sliding around and engaging such split spade terminals.

The central cable is preferably formed as a coiled, retractile cord to maintain the same taut when in use irrespective of the distance between the wiring socket of the towing vehicle and the wiring plug of the trailer. The central cable may also be relatively straight and provided with one or more fastening straps secured thereto for being fastened to any slack portions in the cable to eliminate excessive slack therein.

BRIEF DESCRIPTION OF THE DRAWINGS

FIG. 1 is a perspective view of one preferred form of universal wiring connection cord constructed in accordance with the teachings of the present invention, and further illustrates a common form of wiring socket and associated wiring plug used for interconnecting the electrical lighting systems of a towing vehicle and a trailer.

FIGS. 2, 3 and 4 each illustrate other varying forms of wiring sockets and wiring plugs commercially available for interconnecting electrical lighting systems of a towing vehicle and a trailer.

FIG. 5 shows a bullet terminal which may be inserted into a female connector for converting the same into a male connector.

FIG. 6 shows a male connector having a longitudinally extending slot formed in the tip portion thereof and adapted to be engaged around a flattened spade terminal.

FIG. 7 shows an alternate embodiment of the universal wiring connection cord wherein the central cable thereof is formed as a coiled, retractile cord.

FIG. 8 shows a male banana plug connector coupled to one of the wires extending from the trailer-side end of the universal wiring connection cord, and further shows a split spade adaptor for interconnecting the banana plug to a split spade terminal of the trailer wiring plug.

FIG. 9 illustrates the manner in which the female connectors coupled to the towing vehicle-side end of the universal wiring connection cord are coupled by rigid wire sections to the ends of the flexible wires bundled within the central cable.

FIG. 10 is a cross-sectional view of one form of female connector having a stepped interior surface for providing inner and outer sockets of varying diameters.

FIG. 11 is a cross-sectional view of a female adaptor used to effectively increase the internal diameter of a female connector.

DETAILED DESCRIPTION OF THE PREFERRED EMBODIMENTS

FIG. 1 shows a universal wiring connection cord for use in interconnecting a wiring socket interconnected with the electrical lighting system of a towing vehicle to a wiring plug interconnected to the electrical lighting system of a trailer, according to one preferred embodiment of the present invention. Within FIG. 1, the universal wiring connection cord is designated generally by reference numeral 20. The wiring socket shown in FIG. 1 is designated generally by reference numeral 22 and is shown as being mounted to the bumper 24 of the towing vehicle. The wiring plug interconnected with the electrical lighting system of the trailer is designated generally by reference numeral 26, and is shown as extending ahead of the front portion 28 of the trailer.

Wiring socket 22 shown in FIG. 1 may be of the 6 contact trailer connector type commercially available from, for example, Del City Wire Co., Inc. of Oklahoma City, Oklahoma, under Model Nos. 77695 and 79395. As shown, socket 22 includes a diamond shaped mounting plate 30 secured to bumper 24 by fasteners 32 and 34. Socket 22 includes a central recessed well 36 in which six electrical terminal pins extend; two of such pins are designated by reference numerals 38 and 40 within FIG. 1. As will be noted, pin 40 is disposed within the center of well 36, while pin 38 and the remaining pins are disposed in a pentagonal pattern centered about pin 40. A spring loaded cover 42 is secured to socket 22 above well 36 for sealing off the opening to well 36 when socket 22 is not being used, in order to exclude moisture and dirt. In some instances, spring loaded cover 42 also serves as a lock by releasably retaining trailer plug 26 within recessed well 36 to prevent the same from becoming dislodged therefrom while in use. While socket 22 is shown as a 6 contact trailer connector, similar trailer connector sockets are commercially available with four or five contacts as well.

Trailer plug 26 includes a die cast cylindrical body 44 having an outer diameter commensurate with the inner diameter of recessed well 36 within socket 22. Trailer plug 26 also includes a molded plastic interior 46 in which a number of female electrical terminals are imbedded, including a central female terminal 48 and a peripheral female terminal 50. Trailer plug 26 shown in FIG. 1 is of the type adapted to fit within recessed well 36 of socket 22 and also includes 6 contacts. While trailer plug 26 is shown as a 6 contact plug, other plugs are also available of the same general style but including 4 contacts or 5 contacts.

Still referring to FIG. 1, connection cord 20 includes a central flexible cable 52 having a neoprene outer jacket to resist oil, grease and inclement weather. Central cable 52 also includes therein a number of insulated, stranded copper electrical wires bundled therein, such bundled electrical wires preferably being color coded to aid in identifying and distinguishing the corresponding ends of such wires. The individual stranded copper wires are preferably 14 gauge. A six conductor cable of this general type is commercially available from Del City Wire Co., Inc. of Oklahoma City, Oklahoma, as neoprene trailer cable part No. 96141.

Central cable 52 has a first end 54 normally positioned in the vicinity of wiring socket 22. Extending outwardly from first end 54 of central cable 52 are the first ends of five of the bundled electrical wires, designated by reference numerals 56, 58, 60, 62 and 64. The first ends 56–64 of the bundled electrical wires extending from first end 54 are flexible stranded wire and permit such wires to be moveable relative to each other. First wire end 56 is coupled by a butt connector 66 to one end of a substantially rigid length of wire 68 having a preferred length of approximately 2-4 inches. The opposing end of rigid wire 68 has a female bullet connector 70 secured thereto adapted to be engaged over electrical pin 38 within socket 22. First wire ends 58, 60 and 64 are joined to similar female connectors 72, 74, and 76, respectively, in an identical manner, each for engaging one of the electrical pins within recessed well 36 of socket 22. By including the rigid sections of wire, like that designated by reference numeral 68, it is easier for a user to accurately position the corresponding female connector over one of the electrical pins within socket 22. Once again, because first ends 56, 58, 60 and 64 are flexible, female connectors 70–76 may be moved about relative to one another to assume any number of different orientations, in accordance with the particular wiring socket to which they are to be interconnected.

Still referring to FIG. 1, first wire end 62 is of flexible, copper stranded wire and terminates in a spring-biased alligator clip 78 which may be clipped over any convenient ground connection upon the towing vehicle. The length of wire end 62 may actually be much longer than that shown in FIG. 1 to afford alligator clip 78 a greater reach. If desired, alligator clip 78 may be engaged over one of the electrical pins within socket 22 corresponding to the chassis ground of the towing vehicle.

Central cable 52 includes a second end 80 from which the second ends 82, 84, 86, 88 and 90 extend. Second ends 82–90 are formed of stranded copper wire, and hence, are flexible and may be moved about independently of one another. Second wire end 90 is continuous with first wire end 62 and terminates in a similar spring-biased alligator clip 92 for attachment to a ground connection of the trailer, such as the trailer chassis. The electrical wire within cable 52 corresponding to wire ends 62 and 90 is preferably color coded white to aid in the ready identification of the ground wire.

Second wire end 82 is coupled to a male bullet connector 94 having an electrically conductive metal tip 96 that is adapted to be inserted within female terminal 50 of trailer plug 26. Similarly, second wire ends 84, 86 and 88 are coupled to male bullet connectors 98, 100 and 102 for engaging other female terminals within trailer plug 26.

For cars and trucks made by manufacturers other than Ford Motor Company, trailer plug 26 typically includes female connector terminals having a 0.157 inch internal diameter; accordingly, male bullet connectors 94–102 are preferably of the 0.157 inch diameter variety. Similarly, female bullet connectors 70–76 electrically coupled to first wire ends 56, 58, 60 and 64, respectively, also preferably have a 0.157 inch internal diameter. Trailer sockets and plugs made for vehicles manufactured by Ford Motor Company typically utilize electrical pins and associated female connectors having a 0.176 inch diameter; adaptors for converting the female connectors 70–76 and male connectors 94–102 of connection cord 20 to the larger 0.176 inch diameter are described in greater detail below.

Also shown in FIG. 1 is a first fastening strap 104 having a first end 106 securely wrapped about central cable 52. Fastening strap 104 is preferably formed of Velcro brand fastening material, having a hooked surface 108 on one face thereof and a looped pile surface 110 on the opposite face thereof. Excessive slack within central cable 52 may be eliminated by wrapping fastening strap 104 about the slack portions of central cable 52 and securing such slack portions adjacent the point of central cable 52 at which the first end 106 of fastening strap 104 is secured. A second fastening strap 112 of similar construction may also be provided near second end 80 of central cable 52 if desired.

For clarification those skilled in the art should appreciate that, while a matching socket 22 and trailer plug 26 are shown in FIG. 1, connection cord 20 would most often be used in situations wherein socket 22 and trailer plug 26 do not match one another, either because they are of dissimilar styles, have different numbers or patterns of terminals, or have different types of terminals. For example, the trailer plug 26 shown in FIG. 1 might instead be one of the types shown in FIGS. 2–4, described below.

In FIG. 2, an alternate form of wiring socket 114 and matching trailer plug 116 are shown. Both socket 114 and matching plug 116 are of the 4 contact type. Socket 114 includes a spring-loaded cover 118 and a recessed well 120 similar to those described above in regard to FIG. 1. However, whereas electrical pins 38 and 40 shown in FIG. 1 are substantially cylindrical pins, the terminals 122, 124, 126 and 128 within recessed well 120 are of the split spade variety. Trailer plug 116 also includes a recessed well 130 in which mating split spade terminals 132, 134, 136 and 138, respectively, are supported. Obviously, a trailer having trailer plug 116 previously wired to its electrical lighting system could not be readily interconnected with a towing vehicle having wiring socket 22 of FIG. 1 previously wired to the electrical lighting system thereof, as trailer plug 116 could not be directly engaged with wiring socket 22.

In FIG. 3, a further pair of mating trailer connectors is shown of yet another construction. A plastic molded female trailer connector socket is designated by reference numeral 140 within FIG. 3. Such a trailer connector socket is commercially available from Del City Wire Co., Inc. of Oklahoma City, Oklahoma as part No. 74495, and is known as a 4 contact flat female trailer connector. Socket 140 includes a male bullet 142 extending therefrom and includes integrally molded therein three female bullet connectors 144, 146 and 148. Socket 140 is adapted to mate with plug 150 available from the aforementioned manufacturer under part No. 74475, which is known as a 4 contact flat male molded trailer connector. Plug 150 includes three male bullet connectors 152, 154 and 156 extending therefrom, and further includes a female bullet connector 158 molded therein. While socket 140 and plug 150 are designed to mate with one another, it should be obvious that a trailer having plug 150 previously wired to its electrical lighting system could not be directly inter-connected with a towing vehicle having either wiring socket 22 (see FIG. 1) or wiring socket 114 (see FIG. 2) interconnected with its electrical lighting system.

FIG. 4 illustrates yet another variety of mating trailer socket and plug. Wiring socket 160 is a 6 contact rectangular female trailer connector, and matching trailer plug 162 is a 6 contact male molded trailer connector. Once again, wiring socket 160 and trailer plug 162 are not directly compatible with the other wiring sockets and trailer plugs described above in regard to FIGS. 1–3.

Assuming that the towing vehicle has been provided with a wiring socket of the type designated 140 in FIG. 3, it may then be necessary to convert female connectors 70–76 of interconnection cord 20 into male connectors adapted to be inserted within female bullet connectors 144–148 molded within wiring socket 140. Referring to FIG. 5, female bullet connector 70, coupled to rigid wire 68 is partially cut away to reveal the interior cylindrical channel 164 formed therein. Male bullet connector 166 shown in FIG. 5 has a first end 168 of an external diameter matching the internal diameter of channel 164 of female bullet connector 70, for being inserted therein. The opposing end 170 of bullet connector 166 may be of the same diameter as end 168, or of a larger diameter, as is shown in FIG. 5. Within FIG. 5, female bullet connector 144' is shown in cross section, corresponding to the female bullet connector 144 molded within wiring socket 140 of FIG. 3. End 170 of bullet connector 166 is designed to be inserted within female bullet connector 144'. By forming bullet connector 166 to have a slightly larger second end 170 when compared to first end 168, interconnection cord 52 can readily be adapted to be used with wiring sockets designed for vehicles manufactured by Ford Motor Company, which typically utilize nonstandard 0.176 inch diameter connectors.

Shown in FIG. 6 is male bullet connector 94 of FIG. 1, including electrically conductive tip 96 which includes a longitudinally extending slot 172. Conductive tip 96 may be inserted into a conventional female bullet connector 50, wherein the outer surface of conductive tip 96 grippingly engages the inner cylindrical walls of female bullet connector 50. Alternatively, slot 172 of conductive tip 96 may also be engaged over and around split spade connector 136 within recessed well 130 of trailer plug 116 (see FIG. 2), as indicated by the dashed lines in FIG. 6. Moreover, assuming that slot 172 formed within conductive tip 96 of male bullet connector 94 is formed to include a cylindrical bore, then conductive tip 96 may also be engaged over and around a cylindrical electrical pin 174 of either a wiring socket or trailer plug, as indicated by the dashed lines in FIG. 6.

FIG. 7 illustrates universal wiring interconnection cord according to a second preferred embodiment of the present invention, the connection cord being designated generally by reference numeral 200. As shown in FIG. 7, connection cord 200 includes a central cable 202 formed as a coiled, retractile multiple conductor cord. A five conductor retractile power cord having a neoprene jacket is commercially available from the Royal Electric Division of International Telephone and Telegraph Corporation of Pawtucket, Rhode Island under catalog No. N4589.

As in the previously described embodiment, central cable 200 has a first end 204 from which a series of first wire ends extend, including flexible first wire end 206 coupled by butt connector 208 to a rigid section of wire 210. A female bullet connector 212 is secured to the end of rigid wire section 210 for being engaged with an electrical terminal pin 214 within wiring socket 216. Referring briefly to FIG. 9, first wire end 206, butt connector 208, rigid wire section 210, and female bullet connector 212 are shown in greater detail. Once again, first wire end 206 is made of flexible stranded wire, allowing the user to move female bullet connector 212 to any desired orientation with respect to the other female bullet connectors.

Referring again to FIG. 7, one of the flexible electrical wires bundled within retractile cord 202 is preferably white in color and has a first wire end 218 coupled to a spring-biased test clip 220 for coupling to a ground connection for the towing vehicle. The second wire end 222 of the electrical wire having first wire end 218, is coupled to a similar spring-biased test clip 224 for coupling to a ground connection for the trailer. The remainder of the second wire ends 226, 228, 230, and 232 are each coupled to conventional insulated banana plugs such as the type commercially available from Concord Electronics Corporation of New York, New York, under catalog No. 01-2071-1-02XX. Banana plug 234 includes an insulated handle portion 236 and a springlike conductive tip 238 adapted to be inserted within a female connector 240 of trailer plug 242.

It will be recalled that the trailer plug 116 shown in FIG. 2 includes split spade connector terminals, such as terminal 134. In order to permit conductive tip 238 of banana plug 234 to engage split spade connector terminal 134, a spade adaptor 244 is provided. Spade adaptor 244 has a first generally circular female end 246 having an internal diameter commensurate with conductive tip 238 of banana plug 234. The opposing end 248 of spade adaptor 244 is generally flattened and houses a flattened electrical contact (not shown) for electrically contacting split spade terminal 134 when flattened end 248 of spade adaptor 244 is engaged thereover. Such spade adaptor terminals are commercially available from Del City Wire Co., Inc. of Oklahoma City, Oklahoma as part No. 635003.

As mentioned earlier, the electrical terminals within the various types of wiring sockets may differ in size from one manufacturer to another. Female bullet connectors 70–76 (see FIG. 1) and 212 (see FIG. 7) are preferably made to engage standard 0.157 inch electrical pins. FIGS. 10 and 11 show alternate methods of adapting such female connectors to engage electrical pins or male bullet terminals having a diameter greater than 0.157 inch. Within FIG. 10, a wiring socket is designated generally by reference numeral 250, including a recessed well 252. A first electrical pin is shown in dashed outline and designated by reference numeral 254, while a second electrical pin coaxial therewith is shown in solid outline and designated 256. As shown in FIG. 10, female connector 70' coupled to the end of rigid wire section 68 includes an inner socket portion 258 extending along a central axis designated by dashed line 260. Inner socket portion 258 opens into an outer socket portion 262, which is also centered about central axis 260. The internal diameter of inner socket portion 258 is designed to be commensurate with the outer diameter of electrical pin 254, while the internal diameter of outer socket portion 262 is larger than that of inner socket portion 258, and commensurate with the external diameter of electrical pin 256. In this manner, female connector 70' is adapted to engage electrical pins of two different diameters.

Shown in FIG. 11 is an alternate method for permitting female connector 70 to engage an electrical pin of an outer diameter greater than 0.157 inch. As shown in FIG. 11, a female adaptor 264 is provided for use in conjunction with female connector 70. Female adaptor 264 includes an electrically conductive pin 266 having an external diameter commensurate with the internal diameter of female connector 70. Conductive pin 266 is inserted within female connector 70, as shown in FIG. 11. The end of female adaptor 264 opposite conductive pin 266 includes an electrically conductive socket 268 having an internal diameter larger than that of female connector 70 (e.g., 0.176 inch). Socket 268 is adapted to be engaged over electrical pin 256, thereby electrically coupling female connector 70 thereto.

Those skilled in the art will now appreciate that a universal wiring connection cord has been described which greatly eases the task of interconnecting the electrical lighting systems of a towing vehicle and a trailer, particularly when such electrical lighting systems are pre-wired to a wiring socket and a trailer plug that do not ordinarily match one another. The disclosed connection cord greatly decreases the time normally required to disconnect and properly match the lighting system wiring of the towing vehicle and the trailer. While the invention has been described with reference to preferred embodiments thereof, the description is for illustrative purposes only, and is not to be construed as limiting the scope of the invention. Various modifications and changes may be made by those skilled in the art without departing from the true spirit and scope of the invention as defined by the appended claims.

What is claimed is:

1. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
   (a) a central cable containing a plurality of flexible electrical wires bundled therein, said central cable having a first end for coupling to the electrical system of the towing vehicle and a second end for coupling to the trailer;
   (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
   (c) said plurality of bundled electrical wires each having a second end extending outwardly from the second end of said central cable, the second ends of said plurality of bundled electrical wires being moveable relative to each other in order to assume different orientations with respect to one another, at least two of the plurality of bundled electrical wires each being coupled at its second end to a connector adapted to engage one of the second plurality of terminals within the wiring plug that is interconnected with the electrical lighting system of the trailer;
   (d) at least one of said plurality of bundled electrical wires being coupled at its first end to a spring-biased clip for being clipped to a ground connection on the towing vehicle, said at least one electrical wire also being coupled at its second end to a spring-biased clip for being clipped to a ground connection on the trailer;
whereby said universal wiring connection cord permits the wiring socket of the towing vehicle to be electrically interconnected with the wiring plug of the trailer, even though the first and second predetermined patterns of terminals housed therein do not match one another.

2. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
   (a) a central cable containing a plurality of flexible electrical wires bundled therein, said central cable having a first end for coupling to the electrical system of the towing vehicle and a second end for coupling to the trailer;
   (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
   (c) said plurality of bundled electrical wires each having a second end extending outwardly from the second end of said central cable, the second ends of said plurality of bundled electrical wires being moveable relative to each other in order to assume different orientations with respect to one another, at least two of the plurality of bundled electrical wires each being coupled at its second end to a connector adapted to engage one of the second plurality of terminals within the wiring plug that is interconnected with the electrical lighting system of the trailer;
   (d) at least two of said plurality of bundled electrical wires are each coupled at the first ends thereof to a female connector adapted to be engaged over a terminal pin extending within the wiring socket that is interconnected with the towing vehicle;
   (e) the first ends of said at least two bundled electrical wires are coupled to said female connectors by a substantially rigid section of wire to facilitate proper placement of said female connectors within the socket that is interconnected with the electrical system of the towing vehicle;
whereby said universal wiring connection cord permits the wiring socket of the towing vehicle to be electrically interconnected with the wiring plug of the trailer, even though the first and second predetermined patterns of terminals housed therein do not match one another.

3. A universal wiring connection cord as recited by claim 2 wherein at least two of said plurality of bundled electrical wires have male connectors coupled to the second ends thereof for engaging female terminals within the wiring plug that is interconnected with the electrical lighting system of the trailer.

4. A universal wiring connection cord as recited by claim 3 wherein said male connectors are banana plugs having spring-like electrical conductors for grippingly engaging a female terminal within the wiring socket that is interconnected to the electrical lighting system of the trailer.

5. A universal wiring connection cord as recited by claim 3 wherein said male connectors each have a longitudinally extending slot formed in a tip portion thereof, said longitudinally extending slot being adapted to be engaged with a generally flattened spade terminal within the wiring plug that is interconnected with the electrical lighting system of the trailer.

6. A universal wiring connection cord as recited by claim 2 wherein said central cable is a coiled, retractile cord for remaining taut and untangled when in use.

7. A universal wiring connection cord as recited by claim 2 and further including at least one fastening strap secured to said central cable at a first point thereof and adapted to releasably secure a second point of said central cable adjacent said first point thereof to eliminate excessive slack in said central cable when said universal wiring connection cord is in use.

8. A universal wiring connection cord as recited by claim 2 wherein each of said plurality of bundled electrical wires is of a different color to aid in identifying the corresponding ends of each such wire.

9. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
  (a) a central cable containing a plurality of flexible electrical wires bundled therein, said central cable having a first end for coupling to the electrical system of the towing vehicle and a second end for coupling to the trailer;
  (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
  (c) said plurality of bundled electrical wires each having a second end extending outwardly from the second end of said central cable, the second ends of said plurality of bundled electrical wires being moveable relative to each other in order to assume different orientations with resepct to one another, at least two of the plurality of bundled electrical wires each being coupled at its second end to a connector adapted to engage one of the second plurality of terminals within the wiring plug that is interconnected with the electrical lighting system of the trailer;
  (d) at least two of said plurality of bundled electrical wires are each coupled to the first ends thereof to a female connector adapted to be engaged over a terminal pin extending within the wiring socket that is interconnected with the towing vehicle;
  (e) said female connectors each include an inner socket portion of a first diameter extending along a central axis, said inner socket portion opening into an outer socket portion of a second diameter larger than the first diameter, asid outer socket portion also extending about the central axis, each of said female connectors being adapted to engage within the outer socket portion a wiring pin of a diameter commensurate with said second diameter, as well as being adapted to engage within said inner socket portion a wiring pin of a diameter commensurate with the first diameter;

whereby said universal wiring connection cord permits the wiring socket of the towing vehicle to be electrically interconnected with the wiring plug of the trailer, even though the first and second predetermined patterns of terminals housed thereindo not match one another.

10. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
  (a) a central cable containing a plurality of flexible electrical wires bundled therein, said central cable having a first end for coupling to the electrical system of the towing vehicle and a second end for coupling to the trailer;
  (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
  (c) said plurality of bundled electrical wires each having a second end extending outwardly from the second end of said central cable, the second ends of said plurality of bundled electrical wires being moveable relative to each other in order to assume different orientations with respect to one another, at least two of the plurality of bundled electrical wires each being coupled at its second end to a connector adapted to engage one of the second plurality of terminals within the wiring plug that is interconnected with the electrical lighting system of the trailer;
  (d) at least two of said plurality of bundled electrical wires are each coupled at the first ends thereof to a female connector adapted to be engaged over a terminal pin extending within the wiring socket that is interconnected with the towing vehicle; (e) at least one female adapter having an electrically conductive pin of a diameter commensurate with the internal diameter of said female connectors for being inserted therein, said female adaptor including an electrically conductive socket having an internal diameter larger than the internal diameter of said female connectors for engaging an electrical pin having a diameter larger than the internal diameter of said female connectors;

whereby said universal wiring connection cord permits the wiring socket of the towing vehicle to be electrically interconnected with the wiring plug of the trailer, even though the first and second predetermined patterns of terminals housed therein do not match one another.

11. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
  (a) a central cable containing a plurality of flexible electrical wires bundled therein, said central cable having a first end for coupling to the electrical system of the towing vehicle and a second end for coupling to the trailer;
  (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
  (c) said plurality of bundled electrical wires each having a second end extending outwardly from the second end of said central cable, the second ends of said plurality of bundled electrical wires being moveable relative to each other in order to assume different orientations with respect to one another, at least two of the plurality of bundled electrical wires each being coupled at its second end to a connector adapted to engage one of the second plurality of terminals within the wiring plug that is interconnected with the electrical lighting system of the trailer;
  (d) at least two of said plurality of bundled electrical wires are each coupled at the first ends thereof to a female connector adapted to be engaged over a terminal pin extending within the wiring socket that is interconnected with the towing vehicle;
  (e) at least two bullet terminals, each of said bullet terminals being inserted within one of said at least two female connectors for converting said at least two female connectors into male connectors, adapted to be engaged with a female terminal within the wiring socket that is interconnected with the electrical lighting system of the towing vehicle;
whereby said universal wiring connection cord permits the wiring socket of the towing vehicle to be electrically interconnected with the wiring plug of the trailer, even though the first and second predetermined patterns of terminals housed therein do not match one another.

12. A universal wiring connection cord for interconnecting the electrical lighting system of a towing vehicle with the electrical lighting system of a trailer to be towed, the towing vehicle having a wiring socket interconnected with the electrical lighting system thereof, the wiring socket having a first plurality of terminals housed therein in a first predetermined pattern, the trailer having a wiring plug interconnected with the electrical lighting system thereof, the wiring plug having a second plurality of terminals housed therein in a second predetermined pattern, said connection cord comprising in combination:
  (a) a central cable containing a plurality of flexible electrical wires bundled therein, said central cable having a first end for coupling to the electrical system of the towing vehicle and a second end for coupling to the trailer;
  (b) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector adapted to engage one of the first plurality of terminals within the wiring socket that is interconnected with the towing vehicle; and
  (c) said plurality of bundled electrical wires each having a second end extending outwardly from the second end of said central cable, the seconds ends of said plurality of bundled electrical wires being moveable relative to each other in order to assume different orientations with respect to one another, at least two of the plurality of bundled electrical wires each being coupled at its second end to a connector adapted to engage one of the second plurality of terminals within the wiring plug that is interconnected with the electrical lighting system of the trailer;
  (d) at least two of said plurality of bundled electrical wires are each coupled at the first ends thereof to a female connector adapted to be engaged over a terminal pin extending within the wiring socket that is interconnected with the towing vehicle;
  (e) at least two of said plurality of bundled electrical wires have male connectors coupled to the second ends thereof for engaging female terminals within the wiring plug that is interconnected with the electrical lighting system of the trailer; and
  (f) at least two spade adaptors, each spade adaptor having a first, generally circular female end engaged over one of said male connectors, and each spade adaptor having a generally flattened second end adapted to be engaged with a flattened spade terminal within the wiring plug that is interconnected with the electrical lighting system of the trailer;
whereby said universal wiring connection cord permits the wiring socket of the towing vehicle to be electrically interconnected with the wiring plug of the trailer, even though the first and second predetermined patterns of terminals housed therein do not match one another.

13. Apparatus for interconnecting the electrical lighting system of a towing vehicle with the electrical lighting system of a trailer to be towed, said apparatus comprising in combination:
  (a) a wiring socket interconnected with the electrical lighting system of the towing vehicle, the wiring socket having a first plurality of terminals housed therein in a first predetermined pattern;

(b) a wiring plug interconnected with the electrical lighting system of the trailer, the wiring plug having a second plurality of terminals housed therein in a second predetermined pattern;

(c) a connection cord including:
   (i) a central cable containing a plurality of flexible electrical wires bundled therein, said central cable having a first end for coupling to the wiring socket of the towing vehicle and a second end for coupling to the wiring plug of the trailer;
   (ii) said plurality of bundled electrical wires each having a first end extending outwardly from the first end of said central cable, the first ends of said plurality of bundled electrical wires being moveable relative to each other in order to assume different orientations with respect to one another, at least two of said plurality of bundled electrical wires each being coupled at its first end to a connector which engages one of the first plurality of terminals within the wiring socket of the towing vehicle; and
   (iii) said plurality of bundled electrical wires each having a second end extending outwardly from the second end of said central cable, the second ends of said plurality of bundled electrical wires being moveable relative to each other in order to assume different orientations with respect to one another, at least two of the plurality of bundled electrical wires each being coupled at its second end to a connector which engages one of the second plurality of terminals within the wiring plug of the trailer;

whereby said connection cord electrically interconnects the wiring socket of the towing vehicle with the wiring plug of the trailer, even though the first and second predetermined patterns of terminals housed therein do not match one another.

14. The apparatus as recited by claim 13 wherein at least two of said plurality of bundled electrical wires are each coupled at the first ends thereof to a female connector adapted to be engaged over a terminal pin extending within the wiring socket of the towing vehicle.

15. The apparatus as recited by claim 13 wherein the first ends of said at least two bundled electrical wires are coupled to said connectors by a substantially rigid section of wire to facilitate proper placement of said connectors within the wiring socket of the towing vehicle.

16. The apparatus as recited by claim 14 wherein at least two of said plurality of bundled electrical wires have male connectors coupled to the second ends thereof for engaging female terminals within the wiring plug of the trailer.

17. The apparatus as recited by claim 16 further including at least two spade adaptors, each spade adaptor having a first, generally circular female end engaged over one of said male connectors, and each spade adaptor having a generally flattened second end adapted to be engaged with a flattened spade terminal within the wiring plug of the trailer.

* * * * *